(12) United States Patent
Cheng et al.

(10) Patent No.: US 7,728,052 B2
(45) Date of Patent: Jun. 1, 2010

(54) THERMAL INTERFACE MATERIAL AND METHOD OF PRODUCING THE SAME

(75) Inventors: Ching-Tai Cheng, Tu-Cheng (TW); Nien-Tien Cheng, Tu-Cheng (TW)

(73) Assignee: Foxconn Technology Co., Ltd., Tu-Cheng, Taipei Hsien (TW)

( * ) Notice: Subject to any disclaimer, the term of this patent is extended or adjusted under 35 U.S.C. 154(b) by 831 days.

(21) Appl. No.: 11/309,896

(22) Filed: Oct. 24, 2006

(65) Prior Publication Data

US 2007/0187641 A1 Aug. 16, 2007

(30) Foreign Application Priority Data

Jan. 21, 2006 (CN) .................... 2006 1 0033261

(51) Int. Cl.
*C08K 3/22* (2006.01)
(52) U.S. Cl. .................... 523/200; 524/413; 524/437; 524/588
(58) Field of Classification Search ................ 524/413, 524/437, 588; 523/200
See application file for complete search history.

(56) References Cited

U.S. PATENT DOCUMENTS

| 3,658,311 | A | * | 4/1972 | Di Giambattista et al. ..... 425/10 |
| 5,213,704 | A | * | 5/1993 | Anderson et al. ............. 252/75 |
| 6,040,362 | A | * | 3/2000 | Mine et al. ................... 523/212 |
| 6,605,238 | B2 | * | 8/2003 | Nguyen et al. .............. 252/502 |

* cited by examiner

*Primary Examiner*—Margaret G Moore
(74) *Attorney, Agent, or Firm*—Jeffrey T. Knapp

(57) ABSTRACT

A thermal interface material (10) includes 100 parts by weight of a silicone oil (11) and 800~1200 parts by weight of a metal powder (12) mixed into the silicone oil. An outer surface of each metal particle (121) of the metal powder is coated with a metal oxide layer (122). A method of producing the thermal interface material includes steps of: (1) applying a layer of organo coupling agent on the metal powder; (2) heating the metal powder at a temperature between 200 to 300° C. to coat a metal oxide layer on an outer surface of the metal powder; and (3) adding the metal powder with the coated metal oxide layer to a silicone oil. The thermal interface material has an excellent thermal conductivity and an excellent electrical insulating property.

8 Claims, 2 Drawing Sheets

THERMAL INTERFACE MATERIAL AND METHOD OF PRODUCING THE SAME

FIELD OF THE INVENTION

The present invention relates to a thermal interface material (TIM), and more particularly to a TIM which has an excellent thermal conductivity and an excellent electrical insulating property, whereby the TIM can be suitably applied between a heat generating electronic device and a heat dissipating device for effectively decreasing a thermal resistance therebetween. The present invention also relates to a method for producing such a TIM.

DESCRIPTION OF RELATED ART

It is well known that electronic devices such as central processing units (CPUs) of computers generate a large amount of heat during operation. Generally, a heat dissipating device such as a heat sink is used to dissipate the heat generated by the CPU. The heat sink typically has a first flat surface (e.g., the bottom surface of the heat sink) being attached to a second flat surface of the CPU (e.g., the top surface of the CPU) so that the heat generated by the CPU can be transferred to the heat sink via their contacting surfaces, i.e., the bottom surface of the heat sink and the top surface of the CPU.

In fact, the contacting surfaces between the heat sink and the CPU are rough, especially when viewed microscopically, and each of the contacting surfaces has a plurality of concaves and convexes thereon. When the heat sink is attached to the CPU, air gaps inevitably exist between their contacting surfaces, and accordingly, a thermal resistance between the heat sink and the CPU is relatively high. In order to fill up the air gaps, a thermal interface material (TIM) such as thermal grease is advantageously applied between the heat sink and the CPU so as to decrease the thermal resistance therebetween.

A TIM can be obtained by mixing a highly thermally conductive filler such as a metal powder with a base oil and other contents as desired. The metal powder is used to endow the TIM with an excellent thermal conductivity. However, since the filled metal powder is also highly electrically conductive, the TIM obtained often lacks a desired electrical insulating property, which brings the heat sink to electrically connect with the CPU. As a result, electrostatic energy can be directly transferred to the CPU via the heat sink.

Therefore, it is desirable to provide a TIM wherein the foregoing disadvantage can be overcome or at least alleviated.

SUMMARY OF THE INVENTION

The present invention relates, in one aspect, to a thermal interface material (TIM) for being applied between a heat generating electronic device and a heat dissipating device. The TIM includes 100 parts by weight of a silicone oil and 800~1200 parts by weight of a metal powder mixed into the silicone oil, wherein an outer surface of each metal particle of the metal powder is coated with a metal oxide layer.

The present invention relates, in another aspect, to a method for producing such a TIM. The method comprising steps of: (1) providing a metal powder; (2) applying a layer of organo coupling agent on an outer surface of the metal powder; (3) heating the metal powder and the organo coupling agent layer at a temperature between 200 to 300° C. so as to transform the organo coupling agent layer into a metal oxide layer coated on the outer surface of the metal powder; and (4) adding 800~1200 parts by weight of the metal powder with the metal oxide layer coated thereon to 100 parts by weight of a silicone oil.

Other advantages and novel features of the present invention will become more apparent from the following detailed description of preferred embodiment(s) when taken in conjunction with the accompanying drawings, in which:

DETAILED DESCRIPTION OF THE INVENTION

Figure 1:
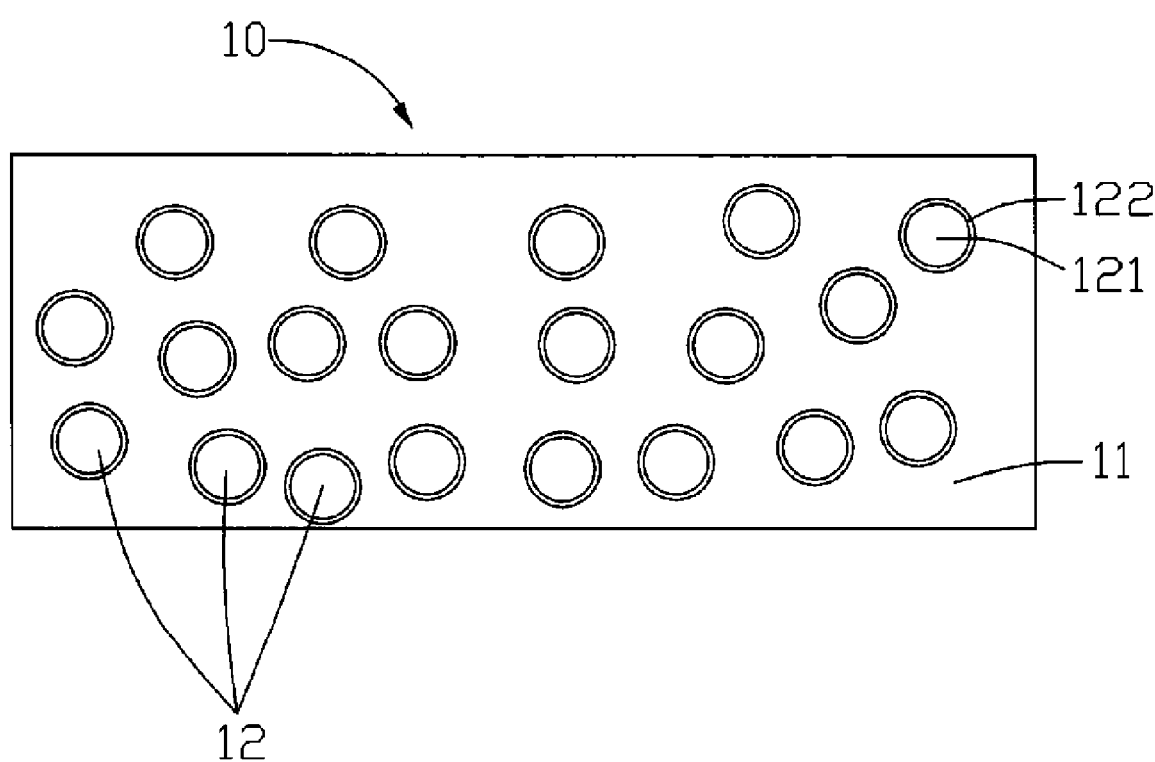
FIG. 1 is a schematic view showing a thermal interface material (TIM) in accordance with an embodiment of the present invention.

FIG. 1 is a schematic view showing a thermal interface material (TIM) 10 in accordance with an embodiment of the present invention. The TIM 10 includes 100 parts by weight of a silicone oil 11 and 800 to 1200 parts by weight of a metal powder 12. The metal powder 12 is mixed into the silicone oil 11.

The metal powder 12 functions to endow the TIM 10 with desired thermal conductivity. An outer surface of each metal particle 121 of the metal powder 12 is coated with a metal oxide layer 122. The metal oxide layers 122 coated on the metal particles 121 increase an electrical insulating property for the TIM 10. The metal particles 121 of the metal powder 12 are made of a metal such as copper, aluminum, zinc, etc. The metal oxide layer 122 is selected from an aluminum oxide layer or a titanium oxide layer or a combination of aluminum oxide layer and titanium oxide layer. The metal powder 12 preferably has a mean particle size of 0.1 to 100 micrometers.

The silicone oil 11 has an organopolysiloxane as its main constituent and has a viscosity of 50 to 50,000 mm2/s at 25° C. The silicone oil 11 functions as a carrier in which the metal powder 12 is dispersed. The organopolysiloxane in the silicone oil 11 may have a linear structure or a branched structure, and may have at least two alkenyl groups in a molecule thereof. The alkenyl group may be ethylene, 1-butylene or 1-hexylene.

Figure 2:
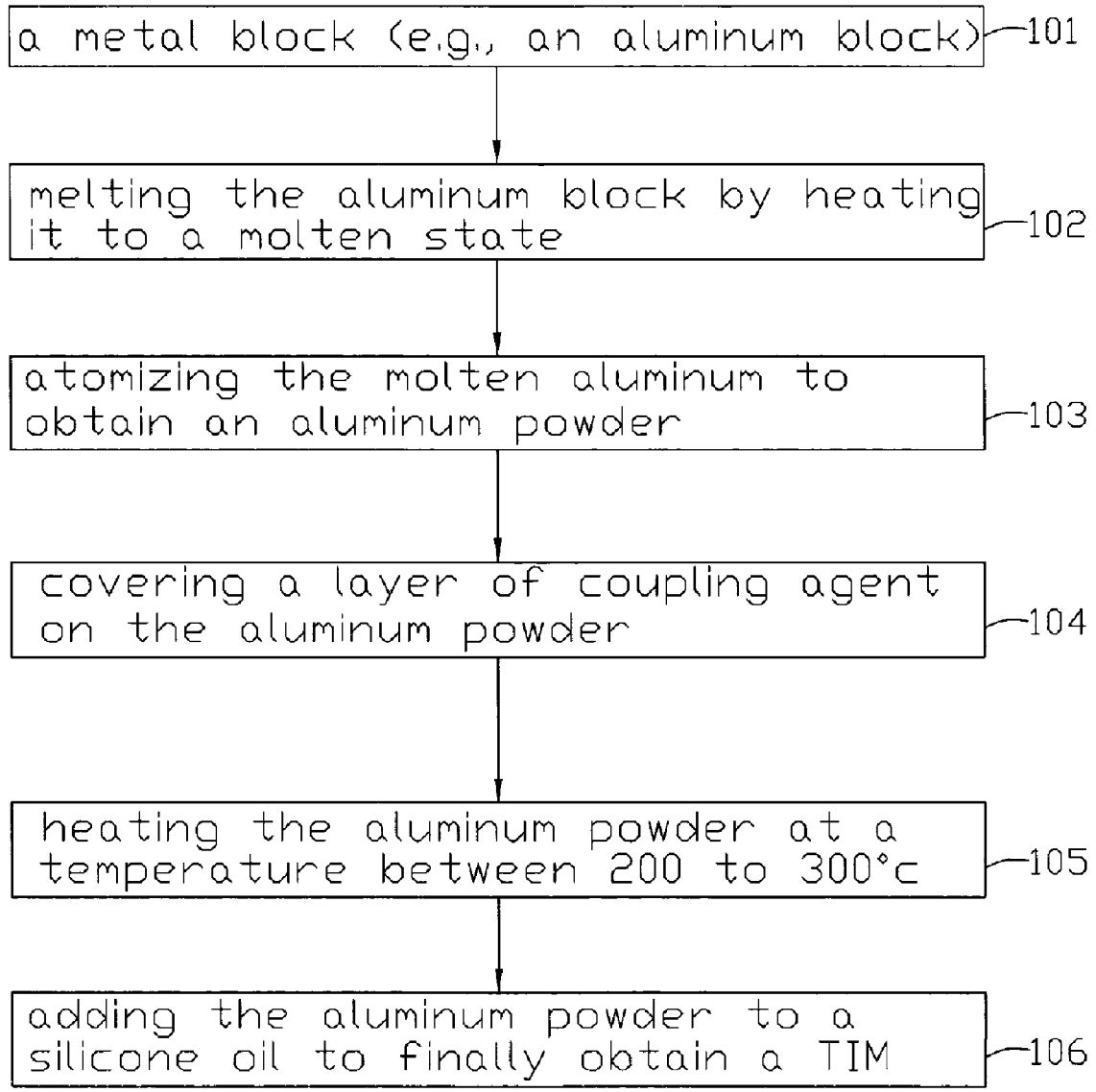
FIG. 2 is a flow chart showing a preferred method for producing the TIM of FIG. 1.

With reference now to FIG. 2, a method used to produce the TIM 10 is disclosed. In step 101, a metal block is provided, wherein the metal block can be an aluminum block, a copper block, a zinc block, etc. For the benefit of readers of this disclosure and by way of example, an aluminum block is hereinafter used in describing this method.

In step 102, the aluminum block is heated to about 800 degrees centigrade to melt the aluminum block.

In step 103, the molten aluminum is atomized to obtain an aluminum powder. For example, the aluminum powder can be obtained from the molten aluminum by blowing the molten aluminum through a nozzle into an environment which is filled with an inert gas such as argon gas. The obtained aluminum powder has spherically shaped particles and is preferred to have an average particle size of about 0.1 to about 5 micrometers.

In step 104, an organo coupling agent is provided, and the coupling agent and the obtained aluminum powder are blended uniformly in a solvent, so that an outer surface of each aluminum particle of the aluminum powder is covered with a thin layer of the organo coupling agent. The organo coupling agent is suitably selected from a titanate-based coupling agent or an aluminate-based coupling agent. Specific examples for the titanate-based coupling agent include isopropyltriisostearoyl titanate, isopropyltris(dioctylpyrophosphate) titanate, isopropyltri(N-amidoethyl, aminoethyl) titanate, tetraoctylbis(ditridecylphosphate) titanate, tetra(2, 2-diallyloxymethyl-1-butyl) bis(ditridecyl)phosphate titanate, bis(dioctylpyrophosphate)oxyacetate titanate bis(dioctylpyrophosphate)ethylene titanate, isopropyltrioctanoyl titanate, isopropyidimethacrylisostearoyl titanate, isopropyltridodecylbenzenesulfonyl titanate, isopropylisostearoyidiacryl titanate, isopropyltri(dioctylphosphate) titanate, isopropyltricumylphenyl titanate, and tetraisopropylbis (dioctylphosphite) titanate. An example for the aluminate-based coupling agent includes alkylacetoacetate aluminum di-isopropylate.

In step 105, the solvent and the aluminum powder with the organo coupling agent layer applied thereon are heated under a low temperature to firstly evaporate or remove the solvent. Then, the aluminum powder with the organo coupling agent layer applied thereon is heated at a temperature between 200 to 300 degrees centigrade to cause the organo coupling agent layer to decompose into metal ions. The metal ions thereafter react with the oxygen in the atmosphere and accordingly, the organo coupling agent layer originally applied on the aluminum powder is transformed to the desired metal oxide layer 122 coated on each particle of the aluminum powder. If a titanate-based coupling agent is used, then the coated metal oxide layer 122 will be a titanium oxide layer. If an aluminate-based coupling agent is used, then the coated metal oxide layer 122 will be an aluminum oxide layer. A thickness of the coated metal oxide layer 122 can be detected by using, for example, X-ray photoelectron spectroscopy (XPS). The thickness of the coated metal oxide layer 122 can be advantageously determined according to the desired electrical insulating property at a designer's choice.

In step 106, 800 to 1200 parts by weight of the aluminum powder wherein each particle thereof is coated with the metal oxide layer 122 on its outer surface is added to and uniformly mixed with 100 parts by weight of the silicone oil 11 to finally obtain the TIM 10.

In use, the TIM 10 is applied between a heat generating electronic device (not shown) such as a central processing unit (CPU) and a heat dissipating device (not shown) such as a heat sink. The TIM 10 is located and compressed between the heat generating device and the dissipating device, and completely fills the air gaps formed between the heat generating device and the dissipating device to thereby effectively decrease the thermal resistance therebetween. The TIM 10 being applied should preferably have a thickness 10~100 micrometers. Due to the presence of the metal particles 121 in the TIM 10, the TIM 10 is endowed with an excellent thermal conductivity. Due to the presence of the outer metal oxide layers 122 coated on the metal particles 121, the TIM 10 is also endowed with an excellent electrical insulating property. Therefore, by use of the present TIM 10, the heat dissipating device is advantageously electrically insulated from the heat generating electronic device while maintaining an intimate thermal contact therebetween.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for producing a thermal interface material, comprising:
    providing a metal powder;
    applying a layer of organo coupling agent on an outer surface of the metal powder;
    heating the metal powder and the organo coupling agent layer at a temperature between 200 to 300° C. so as to transform the organo coupling agent layer into a metal oxide layer coated on the outer surface of the metal powder; and
    adding 800~1200 parts by weight of the metal powder with the metal oxide layer coated thereon to 100 parts by weight of a silicone oil.

2. The method according to claim 1, wherein the step of providing the metal powder comprises heating a metal block to a molten state and then atomizing the molten metal into the metal powder by blowing the molten metal into an environment full of an inert gas.

3. The method according to claim 1, wherein the metal powder includes an aluminum powder having a mean particle size of 0.1 to 5 micrometers.

4. The method according to claim 1, wherein the step of applying a layer of organo coupling agent comprises blending the metal powder and the organo coupling agent in a solvent.

5. The method according to claim 1, wherein the organo coupling agent is selected from at least one of a titanate-based coupling agent and an aluminate-based coupling agent.

6. The method according to claim 5, wherein the titanate-based coupling agent is selected from the group consisting of isopropyltriisostearoyl titanate, isopropyl tris(dioctylpyrophosphate) titanate, isopropyltri(N-amidoethyl, aminoethyl) titanate, tetraoctylbis(ditridecylphosphate) titanate, tetra(2, 2-diallyloxymethyl-1-butyl) bis(ditridecyl)phosphate titanate, bis(dioctylpyrophosphate)oxyacetate titanate, bis(dioctylpyrophosphate)ethylene titanate, isopropyltrioctanoyl titanate, isopropyldimethacrylisostearoyl titanate, isopropyltridodecylbenzenesulfonyl titanate, isopropylisostearoyldiacryl titanate, isopropyltri(dioctylphosphate) titanate, isopropyltricumyiphenyl titanate, and tetraisopropylbis (dioctylphosphite) titanate.

7. The method according to claim 5, wherein the aluminate-based coupling agent is alkylacetoacetate aluminum di-isopropylate.

8. The method according to claim 1, wherein in the step of heating the metal powder and the organo coupling agent layer, the organo coupling agent layer is decomposed into metal ions, and the metal ions thereafter react with the oxygen in the atmosphere thereby transforming the organo coupling agent layer into a metal oxide layer coated on the outer surface of the metal powder.

* * * * *